(12) United States Patent
Munteanu et al.

(10) Patent No.: US 10,670,103 B2
(45) Date of Patent: Jun. 2, 2020

(54) VIBRATION DAMPER

(71) Applicants: THYSSENKRUPP BILSTEIN GMBH, Ennepetal (DE); thyssenkrupp AG, Essen (DE)

(72) Inventors: Virgil Munteanu, Sibiu (RO); Thilo Reimann, Ennepetal (DE)

(73) Assignees: THYSSENKRUPP BILSTEIN GMBH, Ennepetal (DE); THYSSENKRUPP AG, Essen (DE)

( * ) Notice: Subject to any disclaimer, the term of this patent is extended or adjusted under 35 U.S.C. 154(b) by 0 days.

(21) Appl. No.: 15/743,456

(22) PCT Filed: Jul. 11, 2016

(86) PCT No.: PCT/EP2016/066434
§ 371 (c)(1),
(2) Date: Jan. 10, 2018

(87) PCT Pub. No.: WO2017/009287
PCT Pub. Date: Jan. 19, 2017

(65) Prior Publication Data
US 2018/0202508 A1 Jul. 19, 2018

(30) Foreign Application Priority Data
Jul. 16, 2015 (DE) .................. 10 2015 111 538

(51) Int. Cl.
*F16F 9/36* (2006.01)
*F16F 9/32* (2006.01)
(Continued)

(52) U.S. Cl.
CPC .............. *F16F 9/369* (2013.01); *B60G 13/08* (2013.01); *F16F 9/19* (2013.01); *F16F 9/3242* (2013.01);
(Continued)

(58) Field of Classification Search
CPC ...... F16F 9/369; F16F 9/36; F16F 9/19; F16F 9/3242; F16F 9/38; F16F 2226/04;
(Continued)

(56) References Cited

U.S. PATENT DOCUMENTS

| 5,615,867 A | 4/1997 | Bauer |
| 2009/0120749 A1 | 5/2009 | Kolz |

(Continued)

FOREIGN PATENT DOCUMENTS

| CN | 103375527 A | 10/2013 | |
| DE | 9110666 U1 * | 11/1991 | ........... B60G 13/001 |

(Continued)

OTHER PUBLICATIONS

English Translation of International Search Report issued in PCT/EP2016/066434, dated Oct. 26, 2016 (dated Nov. 9, 2016).

*Primary Examiner* — Melanie Torres Williams
(74) *Attorney, Agent, or Firm* — thyssenkrupp North America, LLC

(57) ABSTRACT

A vibration damper, which can be utilized in a chassis of a vehicle, may comprise a damper tube and a working piston that is guided in a longitudinal axis over an inner side of the damper tube. The vibration damper may also include a reinforcing sleeve that is positioned on an outer side of the damper tube. A receptive fork for attachment to the chassis can be arranged on the reinforcing sleeve. The reinforcing sleeve may be delimited in a direction of the longitudinal axis by a peripheral edge. In a region of the peripheral edge, a sealing element enclosing the outer side of the damper tube may be accommodated in the reinforcing sleeve. The peripheral edge may have a plastically deformed reshaping section that engages around the sealing element.

18 Claims, 2 Drawing Sheets

(51) Int. Cl.
  *B60G 13/08*    (2006.01)
  *F16F 9/19*     (2006.01)
  *F16F 9/38*     (2006.01)
  *F16F 9/06*     (2006.01)

(52) U.S. Cl.
  CPC .............. *F16F 9/3271* (2013.01); *F16F 9/38* (2013.01); *B60G 2206/41* (2013.01); *B60G 2206/8109* (2013.01); *F16F 9/061* (2013.01); *F16F 9/065* (2013.01); *F16F 2226/04* (2013.01); *F16F 2230/0023* (2013.01); *F16F 2230/30* (2013.01)

(58) Field of Classification Search
  CPC ............ F16F 2230/023; F16F 2230/30; B60G 15/07; B60G 13/08
  See application file for complete search history.

(56) References Cited

U.S. PATENT DOCUMENTS

2012/0145496 A1   6/2012  Goetz
2013/0276625 A1* 10/2013  Schuler ..................... F16J 1/00
                                                      92/172

FOREIGN PATENT DOCUMENTS

| DE | 19506479 A      | 8/1996  |             |
|----|-----------------|---------|-------------|
| DE | 19516383 A      | 11/1996 |             |
| DE | 19516383 A1 *   | 11/1996 | ............ F16F 9/3242 |
| DE | 10023648 C      | 10/2001 |             |
| DE | 102012218224 B  | 3/2014  |             |
| DE | 102012112717 A  | 6/2014  |             |
| DE | 102013114169 A  | 6/2015  |             |

* cited by examiner

VIBRATION DAMPER

CROSS REFERENCE TO RELATED APPLICATIONS

This application is a U.S. National Stage Entry of International Patent Application Serial Number PCT/EP2016/066434, filed Jul. 11, 2016, which claims priority to German Patent Application No. DE 10 2015 111 538.7, filed Jul. 16, 2015, the entire contents of both of which are incorporated herein by reference.

FIELD

The present disclosure generally relates to vibration dampers, including vibration dampers for chasses of motor vehicles.

BACKGROUND

Arrangements of reinforcing sleeves on the outer side of damping tubes in order to create a mechanical reinforcement for holding a receptive fork are known. Because of the limited wall thickness, the wall of a damping tube cannot in principle be adequately mechanically loaded in order to arrange the receptive fork directly on the outer side of the damper tube, so that a reinforcing sleeve is provided on the damper tube for mechanical reinforcement. Furthermore, in a manner known per se, the reinforcing sleeve has a bead, an annular bulge or the like in order to support the receptive fork against the reinforcing sleeve in the longitudinal axial direction.

The receptive fork is used for chassis attachment and, for example, is connected to an axle journal. Because of the increased forces that are introduced, the reinforcing sleeve is used to stiffen the lower end of the damping tube, the problem frequently occurring that, because of the gap that is formed between the inner side of the reinforcing sleeve and the outer side of the damper tube, gap corrosion occurs. As a rule, therefore, the peripheral edge delimiting the reinforcing sleeve axially in the longitudinal axial direction is welded to the outer side of the damper tube, for example with laser radiation. As a result, because of the action of heat on the damping tube as a result of the welding process, disadvantages result, in particular if the working piston is guided directly over the inner side of the damper tube. Here, it must be recorded that, even in welding processes with minimum introduction of heat, for example by using laser radiation, the action of heat on the damper tube is nevertheless so high that long-lasting operation of the vibration damper will possibly be disrupted, in particular if thermal distortion or an influence on the structure occurs. Even if only a surface impairment to the inner side of the damper tube occurs, long-term, long-lasting operation of the vibration damper can no longer be ensured.

The aim of laser welding is not only an integral connection of the reinforcing sleeve to the damper tube but also a hermetically tight connection of the peripheral edge, so that gap corrosion is avoided. Because of the disadvantages in the application of the welding process, a need exists for an alternative in order to avoid the gap corrosion, in particular without using a welding process.

DETAILED DESCRIPTION

Figure 1:
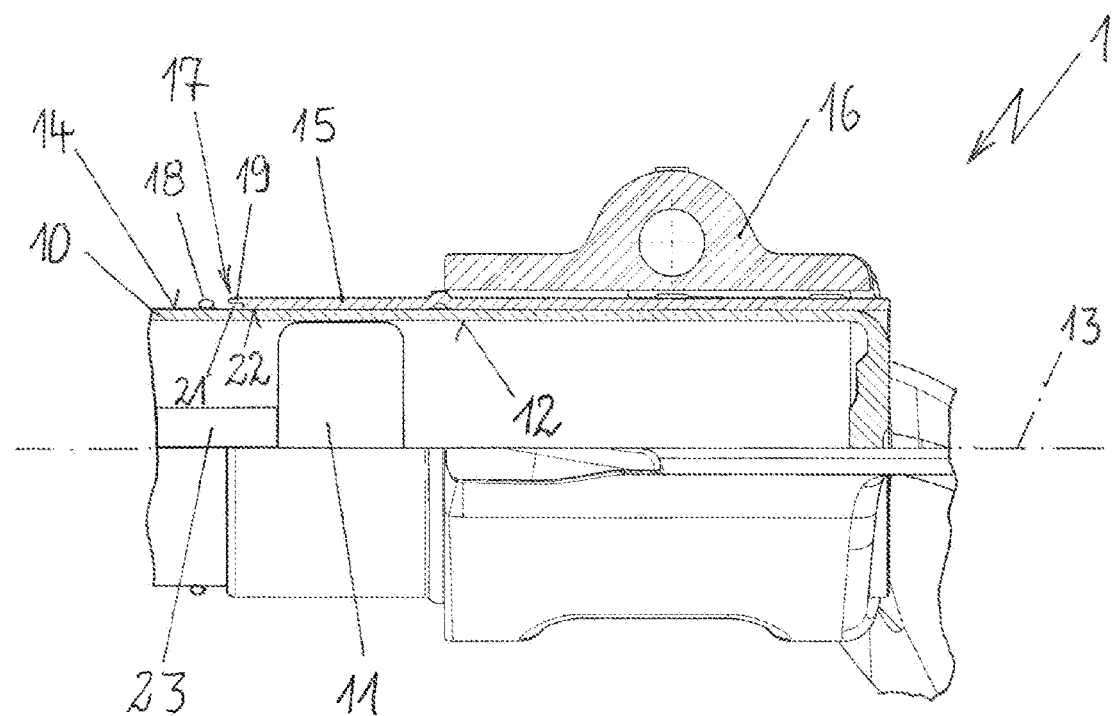
FIG. 1 is a cross-sectional view of an example vibration damper in a region of a lower attachment to a receptive fork, wherein a reshaping section of a reshaped edge has not yet been reshaped.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting 'a' element or 'an' element in the appended claims does not restrict those claims to articles, apparatuses, systems, methods, or the like having only one of that element, even where other elements in the same claim or different claims are preceded by 'at least one' or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The present disclosure generally relates to a vibration damper, in particular for a chassis of a vehicle. In some examples, a vibration damper may include a damper tube and a working piston that is guided in a longitudinal axis over an inner side of the damper tube, and a reinforcing sleeve arranged on an outer side of the damper tube, on which a receptive fork for attachment to the chassis can be arranged. The reinforcing sleeve may be delimited in the longitudinal axis direction by a peripheral edge.

The present disclosure provides, amongst other things, an improvement for a vibration damper having a damper tube and having a reinforcing sleeve arranged on at least a subsection of the damper tube, in such a way that gap corrosion between the reinforcing sleeve and the damper tube is avoided. In particular, the reinforcing sleeve may be arranged on the damper tube with the exclusion of a welding process. The present disclosure further concerns the hermetic sealing of the gap between the damper tube and the reinforcing sleeve.

Starting from a vibration damper according to the preamble of claim 1 and starting from a method according to the preamble of claim 8, the object is achieved by the respective characterizing features. Advantageous developments of the invention are indicated in the dependent claims.

The invention includes the technical teaching that, in the region of the peripheral edge, a sealing element enclosing the outer side of the damper tube is accommodated in the reinforcing sleeve, wherein the peripheral edge has a plastically deformed reshaping section which engages around the sealing element.

The invention is based on the idea of using a sealing element at the end of the reinforcing sleeve in order to prevent the penetration of moisture and contaminants into the gap between damper tube and reinforcing sleeve, and therefore to avoid the formation of gap corrosion. In particular, this produces the advantage that the use of welding processes or other integral connection processes is prevented. In order to accommodate the sealing element effectively in the region of the circumferential edge of the reinforcing sleeve, the invention proposes a plastically deformed reshaping section, wherein, before the reshaping of the reshaping section, the sealing element can be inserted into a groove which is formed on the inner side in the peripheral edge and which is designed to be open toward the end side of the reinforcing sleeve. As a result of the reshaping of the reshaping section, the sealing element is encased substantially completely between the inner side of the reinforcing sleeve and the outer side of the damper tube.

As a result of the reshaping step, the reshaping section is reshaped in such a way that a substantially gap-free termination of the peripheral edge against the outer side of the damper tube is achieved. Consequently, moisture can no longer penetrate into the gap, which is primarily and in particular additionally achieved by the arrangement of the sealing element in or underneath the reshaping section.

According to an advantageous development of the configuration according to the invention for arranging the reinforcing sleeve on the damper tube, the reshaping section is reshaped in such a way that the end of the reshaping section is designed to lie against the outer side of the damper tube. Particularly preferably, the peripheral edge has a groove to accommodate the sealing element, wherein the groove is introduced into the inner side of the peripheral edge of the reinforcing sleeve. Further advantageously, the groove has an L-shape in cross section, so that the groove is designed to be open toward one side, specifically toward the end of the reinforcing sleeve. As a result, the advantage is additionally achieved that the reinforcing sleeve can be pushed onto the damper tube and only then is the sealing element arranged in the groove. The not yet reshaped reshaping section projects over the sealing element and, when the reshaping step is executed, the reshaping section pinches the sealing element between the reshaping section and the outer side of the damper tube. In this process, the shape of the groove is also changed and subsequent to the reshaping process the groove is closed on both sides.

The groove advantageously delimits the reshaping section on the inside toward the damper tube and, for example, is dimensioned in such a way that the sealing element fills the groove completely following the reshaping of the reshaping section. In particular when there is no longer any cavity underneath the reshaping section, the particular advantage is achieved that no moisture can be collected either between the reshaping section in the peripheral edge of the reinforcing sleeve and the outer side of the damper tube. The formation of gap corrosion is particularly effectively avoided thereby.

An advantageous exemplary embodiment of the vibration damper provides for the sealing element to be formed by an O-ring. The O-ring is advantageously matched to the outer side of the damper tube; it is also conceivable that the O-ring has a cord thickness which is matched to the dimension of the groove underneath the reshaping section. The O-ring should be dimensioned such that it is matched to the remaining space underneath the reshaping section when the reshaping operation for reshaping the reshaping section is completed. Slight pinching of the sealing element would be advantageous here, so that the cord thickness of the O-ring can be chosen to be slightly over-dimensioned. Only in this way will the O-ring completely fill the groove following the reshaping operation.

For example, the reshaping section has a radial thickness of 10% to 50% of the wall thickness of the reinforcing sleeve, and/or the reshaping section has a radial thickness of 0.5 mm to 1.5 mm. If the groove is advantageously introduced on the inside in the end region of the reinforcing sleeve, the result is a cross-sectional form of the reinforcing sleeve in the region of the peripheral edge, by means of which the peripheral edge tapers from the inner side and the remaining tapered section of the reinforcing sleeve forms the reshaping section. As a result, the advantage is also achieved that the reshaping forces which are adjusted to reshape the reshaping section are smaller, so that rolling the reshaping section onto the outer side of the damper tube is carried out with lower forces. The forces are advantageously kept so low that deformation of the damper tube by the action of the reshaping tool can be ruled out. The pressing tool used is in particular a rolling tool or another deforming tool, wherein in particular the reshaping section is reshaped rotationally symmetrically about the longitudinal axis, and the reshaping is carried out entirely over the whole of the peripheral edge of the reinforcing sleeve. Only in this way can the penetration of moisture into the gap between the reinforcing sleeve and the damper tube be avoided.

Figure 2:
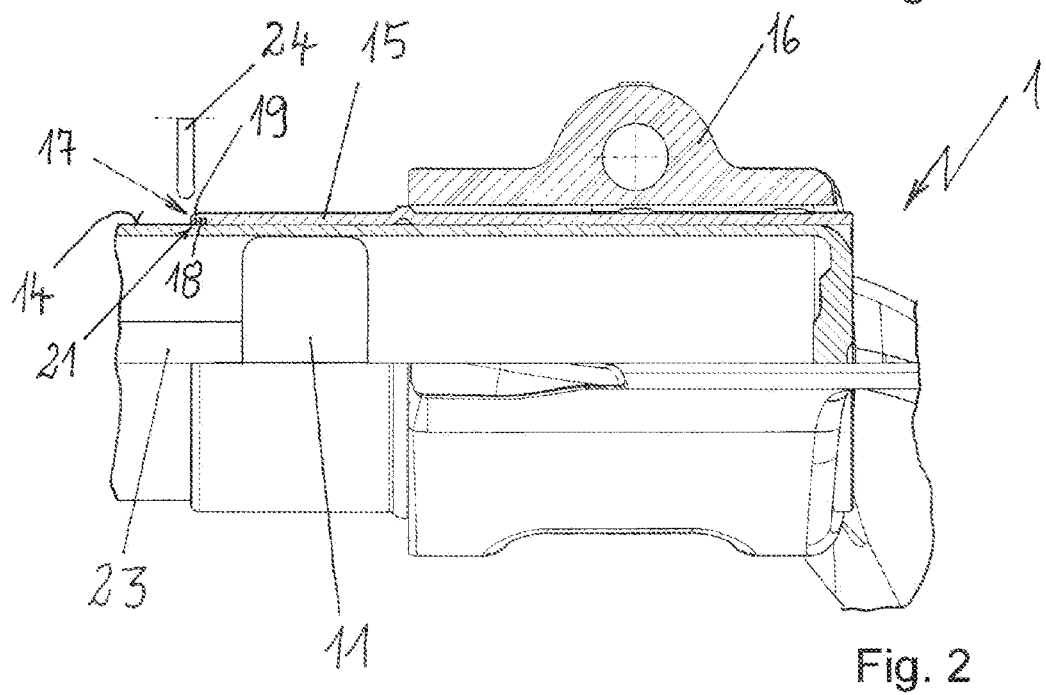
FIG. 2 is the cross-sectional view of the vibration damper of FIG. 1, but the reshaping section of the peripheral edge has been reshaped by a rolling tool.

FIGS. 1 and 2 show, in a half cross-sectional view, the lower part of a vibration damper 1, which forms the part which is attached to the wheel of a vehicle. The vibration damper 1 has a damping tube 10 in which a working piston 11 is guided along a longitudinal axis 13. To guide the working piston 11, use is made of the inner side 12 of the damper tube 10. As a result of the guiding task of the inner side 12, it is necessary for the latter to be damage-free, in particular with regard to dimensional accuracy and with regard to surface quality. The working piston 11 is connected to a piston rod 23, and the piston rod 23 is used for attachment to the vehicle structure.

In order to produce an attachment of the vibration damper 1 to the wheel of the vehicle, use is made, in addition to further components, of a receptive fork 16, which is attached to the lower end of the vibration damper 1 and which, for example, is connected to an axle journal. The receptive fork 16 is seated on a reinforcing sleeve 15, which is designed to be shorter in the longitudinal axial direction than the damper tube 10, and the reinforcing sleeve 15 ends with a peripheral edge 17, from which a further part of the damper tube 10 extends. Because of the gap that forms between the outer side 14 of the damper tube 10 and the inner side 22 of the reinforcing sleeve 15, the disadvantage results that gap corrosion may possibly form, and the configuration of the attachment of the reinforcing sleeve 15 to the damper tube 10, according to the invention and described below, shows one possible way of avoiding gap corrosion.

The peripheral edge 17 has a reshaping section 19, which is formed by a groove 21 being introduced on the inside in the reshaping section 19. As a result, underneath the reshaping section 19, pointing in the direction of the outer side 14 of the damper tube 10, an annular gap is produced, and a sealing element 18 can be inserted into the annular gap, being shown at a distance from the groove 21 in FIG. 1 and, in FIG. 2, being shown accommodated in the groove 21. The sealing of the peripheral edge 17 relative to the outer side 14 of the damper tube 10 therefore provides for the arrangement of a sealing element 18, and the sealing element 18 is embodied as an O-ring.

FIG. 2 shows, schematically, a rolling tool 24 and, after the sealing element 18 has been arranged in the groove 21, the rolling tool 24 is brought into contact with the reshaping section 19, and the reshaping section 19 is reshaped in such a way that the end of the reshaping section 19 is reshaped in the direction toward the outer side 14 of the damper tube 10. As a result of the plastic deformation that occurs, the sealing element 18 remains enclosed in the groove 21, wherein the reshaping of the reshaping section 19 is carried out with the rolling tool 24 in such a way that the end of the reshaping section 19 adjoins the outer side 14 of the damper tube 10, as shown enlarged in FIG. 3.

Figure 3:
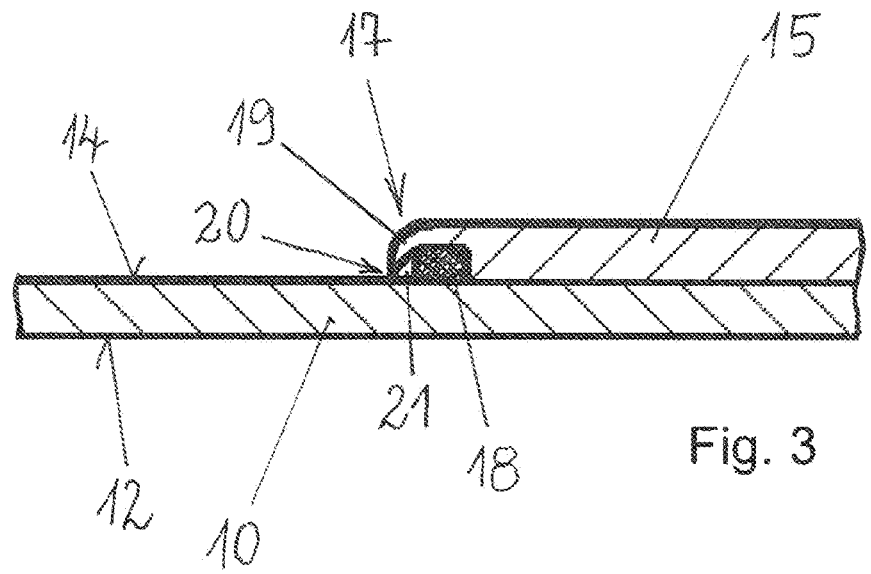
FIG. 3 is a detail view of a peripheral edge on an end side of a reinforcing sleeve that is positioned on a damper tube.

FIG. 3 illustrates, in an enlarged view, the peripheral edge 17 at the end of the reinforcing sleeve 15 which is seated on the damper tube 10. The view shows an already reshaped reshaping section 19, so that the end 20 of the reshaping section 19 adjoins the outer side 14 of the damper tube 10. A closed groove 21, in which the sealing element 18 is seated, has therefore been formed. Merely for illustrative purposes, the sealing element 18 is shown reduced and does not fill the groove 21 completely. In an improving way, the sealing element 18 is dimensioned such that, following the reshaping of the reshaping section 19, said sealing element completely fills the rest of the remaining groove 21. In particular, it is advantageous to roll the end 20 toward the outer side 14 of the damper tube 10 in such a way that a certain compression of the end 20 with the damper tube 10 is produced. As a result, gap formation is avoided in a particular way, and moisture, contaminants and the like cannot penetrate into the gap between the damper tube 10 and the reinforcing sleeve 15. In particular, relatively small cavities between the end 20 of the reinforcing sleeve 15 and the outer side 14 of the damper tube 10 can also be avoided.

The reshaping of the reshaping section 19 with the rolling tool 24, which can also be formed as a flanging tool, a compression tool or the like, the reshaping section 19 is rolled in a metered manner towards the damper tube 10 in such a way that a change in the inner side 12 of the damper tube 10 is not effected, both with regard to the surface and also with regard to the geometric configuration, in particular dimensional stability.

Figure 4:
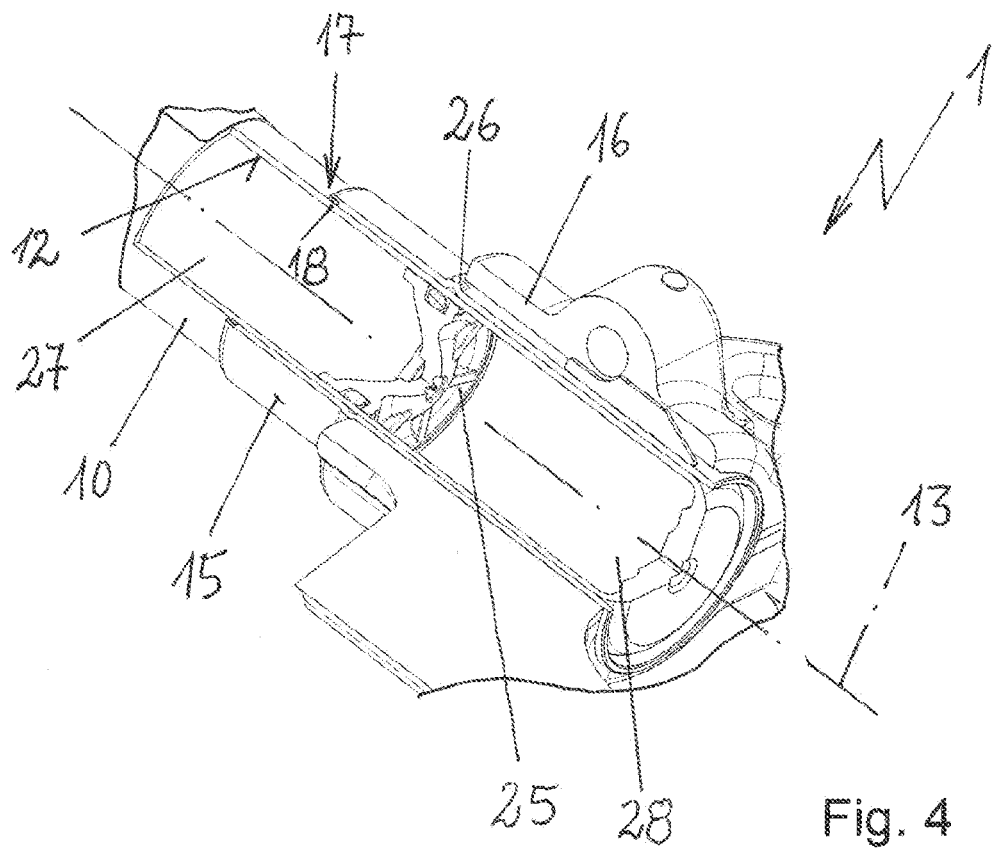
FIG. 4 is a perspective view of an example vibration damper with a peripheral edge.

FIG. 4 shows the lower end of the vibration damper 1 in a repetition of the features of FIGS. 1 and 2 and in a perspective view. The receptive fork 16 for attachment to the wheel of the vehicle is seated on the reinforcing sleeve 15. The receptive fork 16 absorbs forces which extend in the longitudinal axial direction of the longitudinal axis 13 and, in order to form a form fit between the receptive fork 16 and the reinforcing sleeve 15, the reinforcing sleeve 15 has a peripheral bead 26. The receptive fork 16 is clamped onto the reinforcing sleeve 15 whilst applying a tangential stress and, with a collar-shaped end, abuts in the axial direction against the bead 26, so that forces from the damper tube 10 can be transmitted via the reinforcing sleeve 15 to the receptive fork 16 by means of a form fit formed with the bead 26.

Arranged in the damper tube 10 is a separating piston 25, which movably separates a damper chamber 27 filled with oil from a compensating chamber 28 filled with gas. The separating piston 25 is also slidingly guided over the inner side 12 of the damper tube 10. Consequently, it is also important for the arrangement of the separating piston 25 that, in the region of the arrangement of the sealing element 18 in the peripheral groove 17, no dimensional or surface changes of the inner side 12 of the damper tube 10 arise.

In terms of its implementation, the invention is not restricted to the preferred exemplary embodiment indicated above. Instead, a number of variants are conceivable which make use of the solution illustrated, even with fundamentally different types of embodiments. All the features and/or advantages emerging from the claims, the description or the drawings, including constructional details or physical arrangements, can be important to the invention, both on their own and also in an extremely wide range of combinations.

LIST OF DESIGNATIONS

1 Vibration damper
10 Damper tube
1 Working piston
12 Inner side
13 Longitudinal axis
14 Outer side
15 Reinforcing sleeve
16 Receptive fork
17 Peripheral edge
18 Sealing element
19 Reshaping section
20 End
21 Groove
22 Inner side
23 Piston rod
24 Rolling tool
25 Separating piston
26 Bead
27 Damper chamber
28 Compensating chamber

What is claimed is:

1. A vibration damper for a chassis of a vehicle, the vibration damper comprising:
   a damper tube;
   a working piston that is guided in a longitudinal axis over an inner side of the damper tube;
   a reinforcing sleeve disposed on an outer side of the damper tube, the reinforcing sleeve being delimited in a direction of the longitudinal axis by a peripheral edge;
   a receptive fork for attachment to the chassis, wherein the receptive fork is positionable on the reinforcing sleeve; and
   a sealing element disposed in a region of the peripheral edge and accommodated in the reinforcing sleeve, the sealing element enclosing the outer side of the damper tube, wherein the peripheral edge has a plastically deformed reshaping section that engages around the sealing element,
   wherein the plastically deformed reshaping section has a radial thickness of 10% to 50% of a wall thickness of the reinforcing sleeve.

2. The vibration damper of claim 1 wherein an end of the plastically deformed reshaping section is configured to lie against the outer side of the damper tube.

3. The vibration damper of claim 1 wherein the inner side of the reinforcing sleeve includes a groove that receives the sealing element in the peripheral edge.

4. The vibration damper of claim 3 wherein the groove terminates the plastically deformed reshaping section and points inward toward the damper tube.

5. The vibration damper of claim 3 wherein the groove is dimensioned such that the sealing element fills the groove.

6. The vibration damper of claim 1 wherein the sealing element is an O-ring.

7. The vibration damper of claim 1 wherein the plastically deformed reshaping section has a radial thickness of 0.5 mm to 1.5 mm.

8. The vibration damper of claim 1 wherein the radial thickness of the plastically deformed reshaping section is in a range of 0.5 mm to 1.5 mm.

9. A method for positioning a reinforcing sleeve on an outer side of a damper tube of a vibration damper for a chassis of a vehicle, wherein the reinforcing sleeve extends over a subsection of the damper tube, wherein a receptive fork for attachment to the chassis is positionable on the outer side of the reinforcing sleeve, wherein a working piston of the vibration damper is received in the damper tube and is guided in a longitudinal axis over an inner side of the damper tube, wherein the reinforcing sleeve terminates in a direction of the longitudinal axis with a peripheral edge, wherein the method comprises:

provide the reinforcing sleeve with a groove in a region of the peripheral edge;

providing the damper tube;

positioning the reinforcing sleeve on the outer side of the damper tube;

positioning a sealing element in the groove from the direction of the longitudinal axis; and plastically deforming the peripheral edge such that a reshaping section of the reinforcing sleeve engages around the sealing element.

10. The method of claim 9 wherein the plastic deformation of the peripheral edge is performed with a rolling tool.

11. The method of claim 9 wherein the plastic deformation of the peripheral edge causes an end of the reshaping section of the reinforcing sleeve to lie against the outer side of the damper tube.

12. A vibration damper comprising:

a damper tube;

a working piston that is guided in a longitudinal axis over an inner side of the damper tube;

a reinforcing sleeve disposed on an outer side of the damper tube, the reinforcing sleeve being delimited in a direction of the longitudinal axis by a peripheral edge; and a sealing element that is disposed in a region of the peripheral edge and encloses the outer side of the damper tube, wherein the peripheral edge of the reinforcing sleeve has a plastically deformed reshaping section that engages around the sealing element, wherein the plastically deformed reshaping section has a radial thickness of 10% to 50% of a wall thickness of the reinforcing sleeve.

13. The vibration damper of claim 12 wherein an end of the plastically deformed reshaping section is disposed against the outer side of the damper tube.

14. The vibration damper of claim 12 wherein the inner side of the reinforcing sleeve includes a groove that receives the sealing element in the peripheral edge.

15. The vibration damper of claim 14 wherein the groove terminates the plastically deformed reshaping section and points inward toward the damper tube.

16. The vibration damper of claim 14 wherein the groove is dimensioned such that the sealing element fills the groove.

17. The vibration damper of claim 12 wherein the sealing element is an O-ring.

18. The vibration damper of claim 12 wherein the radial thickness of the plastically deformed reshaping section is in a range of 0.5 mm to 1.5 mm.

* * * * *